US012695353B2

(12) United States Patent
Zhou et al.

(10) Patent No.: US 12,695,353 B2
(45) Date of Patent: Jul. 28, 2026

(54) BEARING CURRENT DISCHARGE ASSEMBLIES FOR ELECTRIC VEHICLES

(71) Applicant: GM GLOBAL TECHNOLOGY OPERATIONS LLC, Detroit, MI (US)

(72) Inventors: Sen Jiang Zhou, Troy, MI (US); David J. Varda, West Bloomfield, MI (US); Bradford E. Vorbeck, Clarkston, MI (US); Zachary Strand, Salem, OR (US); Timothy J. Reinhart, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 167 days.

(21) Appl. No.: 18/612,331

(22) Filed: Mar. 21, 2024

(65) Prior Publication Data

US 2025/0300519 A1      Sep. 25, 2025

(51) Int. Cl.
| | |
|---|---|
| *H02K 5/173* | (2006.01) |
| *H02K 5/22* | (2006.01) |
| *H02K 11/40* | (2016.01) |

(52) U.S. Cl.
CPC ........... H02K 5/1735 (2013.01); H02K 5/225 (2013.01); H02K 11/40 (2016.01)

(58) Field of Classification Search
CPC ........ H02K 5/173; H02K 5/1735; H02K 5/22; H02K 5/225; H02K 11/40; H02K 13/003
See application file for complete search history.

(56) References Cited

U.S. PATENT DOCUMENTS

| | | | | |
|---|---|---|---|---|
| 2020/0295634 A1* | 9/2020 | Lenz | .................... | H01R 39/025 |
| 2022/0311315 A1* | 9/2022 | Lindener | ............... | H02K 7/003 |
| 2024/0154505 A1* | 5/2024 | Brand | .................... | H02K 11/40 |

FOREIGN PATENT DOCUMENTS

| | | | | |
|---|---|---|---|---|
| DE | 102016010926 A1 | 9/2017 | | |
| DE | 102021213387 A1 | 6/2023 | | |
| EP | 4068581 A2 | 10/2022 | | |
| EP | 4068581 B1 * | 10/2022 | ............... | H02K 1/32 |

OTHER PUBLICATIONS

English translation of DE-102021213387-A1 (Year: 2023).*
German Office Action from counterpart DE1020241131683, dated Feb. 21, 2025.

* cited by examiner

*Primary Examiner* — Tulsidas C Patel
*Assistant Examiner* — Joshua Kiel M Rodriguez

(57) ABSTRACT

A current discharge assembly for an electric machine in an electric vehicle, includes a rotor shaft defining a channel, a ground element positioned within the channel, and a connector positioned within the channel of the rotor shaft and extending circumferentially between the rotor shaft and the ground element. The connector is configured to electrically couple the rotor shaft to the ground element when the rotor shaft is rotating to allow current to flow from the rotor shaft to the ground element via the connector. Other example current discharge assemblies and methods for manufacturing current discharge assemblies are also disclosed.

20 Claims, 8 Drawing Sheets

FIG. 12

BEARING CURRENT DISCHARGE ASSEMBLIES FOR ELECTRIC VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to bearing current discharge assemblies for electric vehicle.

An electric vehicle (EV) includes one or more electric machines that operate as a motor to propel the vehicle and as a generator during regeneration. The electric machines include an EV drive unit having a stator, main bearings, a rotor shaft rotating on the main bearings, and a rotor mounted on the rotor shaft and rotating relative to the stator. Sometimes, current is generated in the rotor shaft due to a voltage differential created on the rotor shaft based on a magnetic field generated between the stator and the rotor. This current is often referred to as electrical discharge machining (EDM) current. The current may circulate from the rotor shaft and cause damage to the main bearings. To reduce this circulating current, some electric machines may employ a brush, carbon sticks, or a sacrificial bearing positioned on an exterior side of the rotor shaft.

SUMMARY

A current discharge assembly for an electric machine in an electric vehicle, includes a rotor shaft defining a channel, a ground element positioned within the channel, and a connector positioned within the channel of the rotor shaft and extending circumferentially between the rotor shaft and the ground element. The connector is configured to electrically couple the rotor shaft to the ground element when the rotor shaft is rotating to allow current to flow from the rotor shaft to the ground element via the connector.

In other features, the ground element is a pipe extending into the channel of the rotor shaft and configured to provide a lubricant into the channel of the rotor shaft.

In other features, the current discharge assembly further includes a plug positioned in the channel between the pipe and the rotor shaft. The plug is configured to prevent the lubricant provided by the pipe from contacting the connector.

In other features, the plug is a first plug positioned adjacent to a first side of the connector, and the current discharge assembly further includes a second plug positioned adjacent to a second side of the connector opposing the first side.

In other features, the pipe has an outer diameter, the current discharge assembly further includes a mounting bracket extending circumferentially along the outer diameter of the pipe, and the connector is attached to the mounting bracket.

In other features, the rotor shaft defines an outer diameter of the channel, the current discharge assembly further includes a mounting bracket extending circumferentially along the outer diameter of the channel, and the connector is attached to the mounting bracket.

In other features, the connector is a brush including a body and a plurality of bristles extending from the body.

In other features, the plurality of bristles include carbon fiber.

In other features, the plurality of bristles extend from the body towards the ground element and are configured to contact the ground element.

In other features, the plurality of bristles extend from the body towards the rotor shaft and are configured to contact the rotor shaft.

In other features, the connector is a bearing positioned between the rotor shaft and the ground element.

In other features, the bearing is a roller bearing or a ball bearing.

In other features, the connector includes a body and one or more spring loaded sticks configured to bias against one of the rotor shaft and the ground element.

In other features, the one or more spring loaded sticks are configured to bias against the rotor shaft.

In other features, the one or more spring loaded sticks are configured to bias against the ground element.

A method for manufacturing a current discharge assembly for an electric machine in an electric vehicle is disclosed. The electric machine includes a rotor shaft defining a shaft channel. The method includes providing a mounting bracket having a body defining a bracket channel extending therethrough, cutting at least one slot into the body of the mounting bracket, attaching a connector to the mounting bracket via the slot, the connector extending into the bracket channel, inserting a ground element into the bracket channel of the mounting bracket to contact the connector extending into the bracket channel, and inserting the ground element and the mounting bracket with the attached connector into the shaft channel of the rotor shaft so that the connector electrically couples the rotor shaft to the ground element when the rotor shaft is rotating to allow current to flow from the rotor shaft to the ground element via the connector.

In other features, attaching the connector to the mounting bracket via the slot includes pressing the connector into the slot.

In other features, the connector is a brush having a plurality of bristles.

In other features, the ground element is a pipe configured to provide a lubricant into the shaft channel of the rotor shaft.

In other features, the method further includes forming at least one plug between the pipe and the rotor shaft to prevent the lubricant provided by the pipe from contacting the brush.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 12 is a diagram of an example method for manufacturing a current discharge assembly, according to the present disclosure.

In the drawings, reference numbers may be reused to identify similar and/or identical elements.

DETAILED DESCRIPTION

An EV includes one or more electric machines having an EV drive unit. In such examples, the EV drive unit includes a stator, main bearings, a rotor shaft rotating on the main bearings, and a rotor mounted on the rotor shaft and rotating relative to the stator. In the EV drive unit, circulating current, such as EDM current generated in the rotor shaft may pass through the main bearings causing damage to the bearings. In turn, this may lead to severe noise, vibration, and harshness (NVH) issues and even system failure. Current devices to reduce the circulating current are positioned on an exterior side of the rotor shaft. Such devices require additional packaging space due to their size and are often ineffective in lubricated environments.

The current discharge assemblies according to the present disclosure provide solutions for positioning a connector, such a brush, a bearing, etc. within a rotor shaft and around a ground element, such as a lube pipe in the rotor shaft. With this configuration, the connector electrically couples an inner surface of the rotor shaft and an outer surface of the ground element located at a center region of the rotor shaft when, for example, the rotor shaft is rotating. In doing so, circulating current (e.g., EDM current, etc.) generated in the rotor shaft is discharged to the ground element via the connector. Due to the low linear speed at the center of the rotor shaft, the ground element creates a low drag and effective way for current to discharge with a low risk of experiencing degradation. Additionally, because the connector is positioned within the rotor shaft, packaging space around the exterior side of the rotor shaft may be reduced as compared to conventional systems or used for other purposes.

Figure 1:
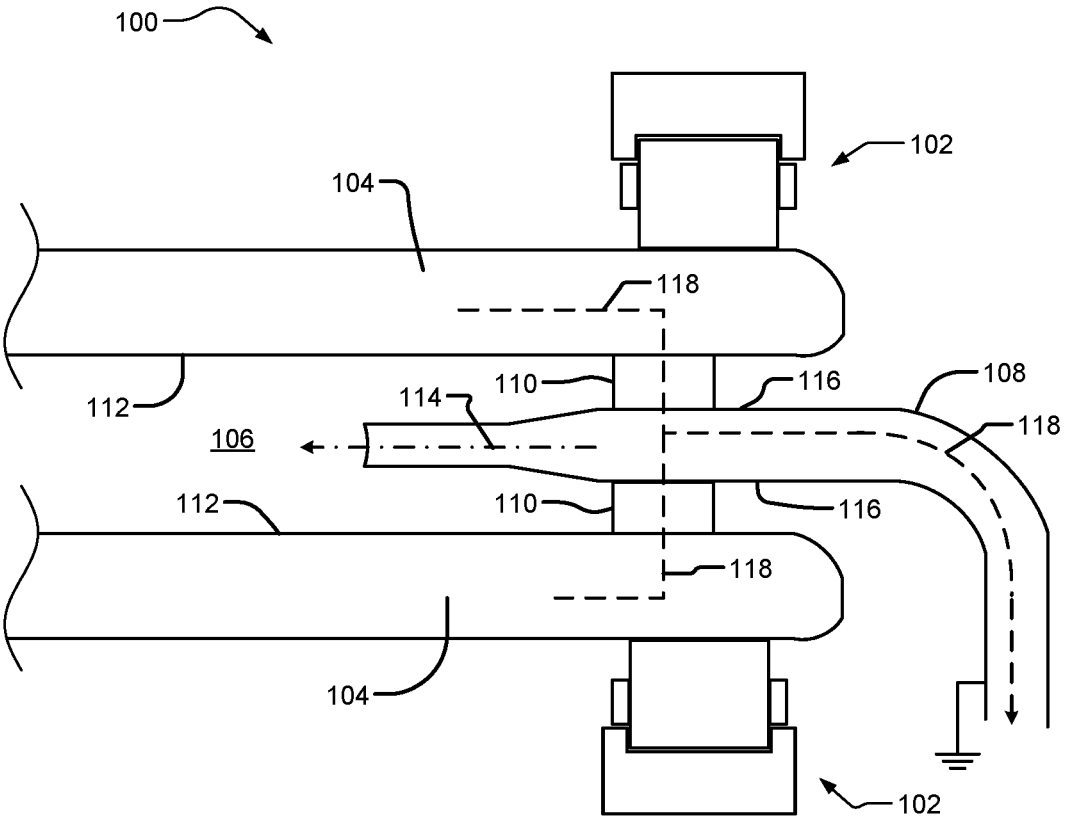
FIG. 1 is a diagram of an example current discharge assembly for an electric machine in an electric vehicle, according to the present disclosure.

Referring now to FIG. 1, an example current discharge assembly 100 is presented for an electric machine in an EV. In such examples, the EV may be a pure EV, a hybrid vehicle, a fuel cell vehicle, or any other suitable type of EV having one or more electric machines that operate as a motor to propel the vehicle and as a generator during regeneration.

As shown, the current discharge assembly 100 generally includes a bearing 102, a rotor shaft 104 rotating on the bearing 102, a ground element 108 in the rotor shaft 104, and a connector 110 in the rotor shaft 104. While not shown in FIG. 1, the current discharge assembly 100 is employable with other conventional components of the electric machine the EV, such as a stator (e.g., connected to a case of the electric machine), a rotor mounted on the rotor shaft 104 and rotating relative to the stator.

In the example of FIG. 1, the rotor shaft 104 defines a channel 106. For example, the rotor shaft 104 may be a tubular structure. In such examples, the rotor shaft 104 includes an inner surface 112 defining the channel 106, as shown in FIG. 1. With this configuration, the inner surface 112 of the rotor shaft 104 defines an outer diameter of the channel 106.

As shown in FIG. 1, the ground element 108 is an electrically conductive and grounded device. In various embodiments, the ground element 108 may be formed of or include electrically conductive material, such as steel, copper, aluminum, carbon, etc. In the example of FIG. 1, the ground element 108 may be grounded in any suitable manner. For instance, an outer surface 116 of the ground element 108 may be directly coupled to ground (e.g., earth ground). In other examples, the outer surface 116 of the ground element 108 may be indirectly coupled to ground via another electrically conductive component, such as a grounded metal bracket contacting the ground element 108.

The ground element 108 is positioned within the channel 106 defined by the rotor shaft 104. More specifically, in the example of FIG. 1, the ground element 108 extends into the channel 106 of the rotor shaft 104. In various embodiments, the ground element 108 may be a lube pipe that extends from a lubricant source to the channel 106. In such examples, the lube pipe may provide lubricant into the channel 106 of the rotor shaft 104. Such lubricant flow is represented by an arrow 114 having a dash-dot-dash configuration. In other examples, the ground element 108 may be another suitable device that is electrically conductive and grounded.

In various embodiments, the current discharge assembly 100 may include one or more other optional components. For example, and as further explained below, the current discharge assembly 100 may include one or more plugs (not shown) positioned on one or both sides of the connector 110. In such examples, the plug(s) may be positioned in the channel 106 between the ground element 108 (e.g., the pipe) and the rotor shaft 104. In various embodiments when the ground element 108 is a lube pipe, at some of the plugs may function as a seal to prevent lubricant provided by the pipe from contacting the connector 110.

Additionally, in some examples, the current discharge assembly 100 may include an electrically conductive mounting bracket or mounting ring (not shown), as further explained below. In such examples, various components, such as the connector 110, one or more plugs, etc. may be attached to the mounting bracket via adhesive, solder, one or more mechanical fasteners (e.g., screws, rivets, etc.), and/or any other suitable fastening means. With this configuration, the mounting bracket may provide a mechanism to maintain components of the current discharge assembly 100 as one piece. In turn, this may provide ease of installing and/or removing components of the current discharge assembly 100 during manufacturing and/or maintenance of the electric machine (e.g., the EV drive unit).

As shown in FIG. 1, the connector 110 is an electrically conductive device positioned within the channel 106 of the rotor shaft 104. More specifically, the connector 110 extends circumferentially between the rotor shaft 104 and the ground element 108, as shown in FIG. 1. In various embodiments, the connector 110 may be formed of or include electrically conductive material, such as steel, copper, aluminum, carbon, conductive grease, etc.

In the example of FIG. 1, the connector 110 electrically couples the rotor shaft 104 to the ground element 108. This may occur when the rotor shaft 104 is rotating and sometimes when the rotor shaft 104 is not rotating. With this configuration, EDM current generated in the rotor shaft 104 due to accumulated voltage on the rotor shaft 104 and/or other circulating current in the rotor shaft 104 is allowed to flow from the rotor shaft 104 to the ground element 108 via the connector 110. As such, current is directed away from the bearing 102, thereby preventing damage to the bearing 102. In the example of FIG. 1, the current flow is represented by an arrow 118 having a dash-dash configuration.

In the example of FIG. 1, the connector 110 may be any suitable type of device that provides an electrically conductive path between the rotor shaft 104 and the ground element 108 for current flow. In various embodiments, the connector 110 may be structured to accommodate the movement (e.g., rotation) of the rotor shaft 104 relative to the stationary ground element 108. For instance, and as further explained herein, the connector 110 may include a brush, a bearing (e.g., a sacrificial bearing), one or more spring loaded sticks, etc.

Figure 2:
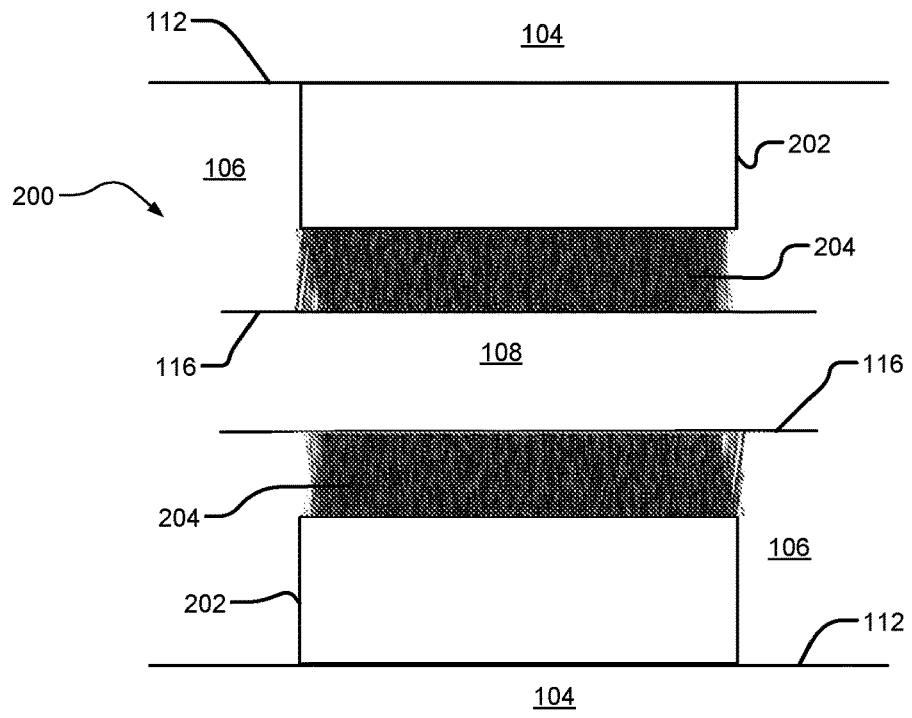
FIGS. 2-3 are diagrams of example brushes employable in the current discharge assembly of FIG. 1, according to the present disclosure.
Figure 3:
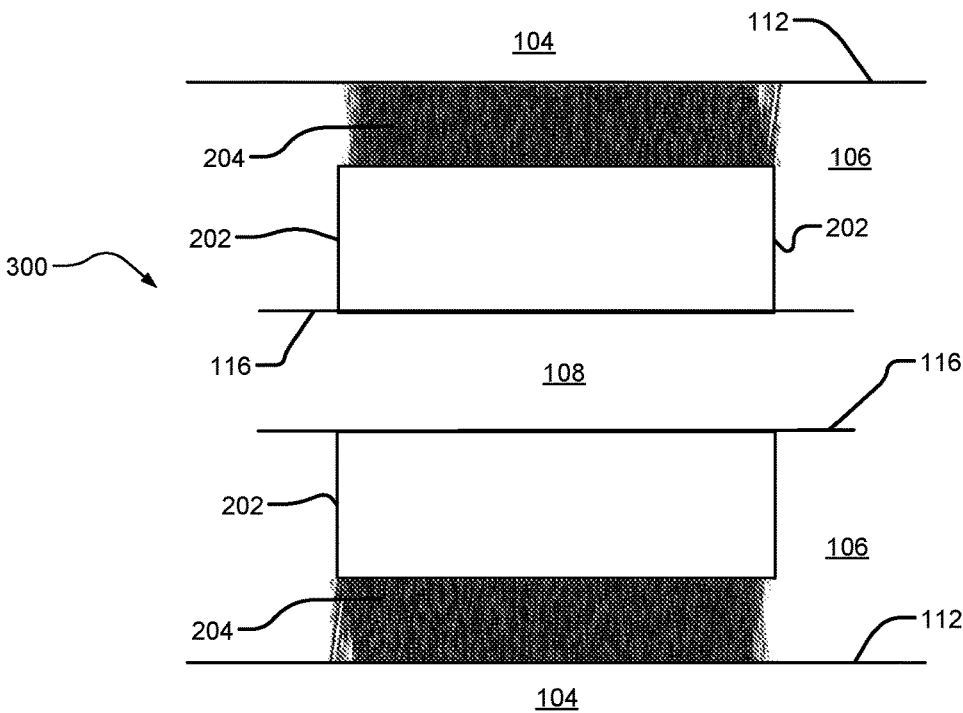

For example, FIGS. 2-3 depict examples of different configurations of brushes 200, 300 that may be employed as the connector 110 of FIG. 1. For example, and as shown in FIGS. 2-3, each brush 200, 300 is positioned in the channel 106 of the rotor shaft 104 of FIG. 1, and between the inner surface 112 of the rotor shaft 104 and the outer surface 116 of the ground element 108 of FIG. 1.

Specifically, FIG. 2 depicts the brush 200 as including a body 202 and bristles 204 extending from the body 202. In such examples, the body 202 and the bristles 204 may be formed of or include any suitable electrically conductive material. For instance, the body 202 may be formed of or include steel, aluminum, copper, etc. Additionally, the bristles 204 may include carbon fiber or another suitable compliant conductive material.

In example of FIG. 2, the brush 200 has a brush-in configuration. For example, and as shown in FIG. 2, the bristles 204 extend from the body 202 towards the ground element 108 (e.g., the pipe), and contact the outer surface 116 of the ground element 108. In such examples, the body 202 of the brush 200 may be attached (e.g., adhered, soldered, mechanically fastened, etc.) to the inner surface 112 of the rotor shaft 104 as shown in FIG. 2. Alternatively, in other embodiments, the body 202 may be attached to a mounting bracket if employed.

In FIG. 3, the brush 300 is similar to the brush 200 of FIG. 2 but where the brush 300 is in a different configuration. Specifically, the brush 300 includes the body 202 and the bristles 204 of FIG. 2, but the brush 300 has a brush-out configuration. For example, and as shown in FIG. 3, the bristles 204 extend from the body 202 towards the rotor shaft 104, and contact the inner surface 112 of the rotor shaft 104. In such examples, the body 202 of the brush 300 may be attached (e.g., adhered, soldered, mechanically fastened, etc.) to the outer surface 116 of the ground element 108.

In the examples of FIGS. 2-3, the bristles 204 may extend from the body 202 in any suitable manner. For example, the bristles 204 may cover the entire or a portion of the outer circumference of the body 202. In such examples, the bristles 204 of FIG. 2 may entirely or partially encircle the corresponding portion of the outer surface 116 of the ground element 108, and the bristles 204 of FIG. 3 may entirely or partially encircle the corresponding portion of the inner surface 112 of the rotor shaft 104. Additionally, in some examples, the bristles 204 of FIGS. 2-3 may uniformly extend from the body 202 or not. For instance, the bristles 204 may form a uniform block, a spiral, etc. In other examples, the bristles 204 may be located at the inner or the outer portion of the body 202 (e.g., a brush ring base).

Additionally, the brushes 200, 300 of FIGS. 2-3 may have any suitable size. For example, the brushes 200, 300 may have a suitable width and a relatively thin ring to fit between the inner diameter of the rotor shaft 104 and around the outer surface 116 of the ground element 108. In various embodiments, the brushes 200, 300 may have a wide base and thin ring shape to fit between about a 5 mm to about 10 mm radius space with a pitch of less than about 15 mm. In some examples, the braid path of the bristles 204 may be longer than conventional brushes, and/or the brushes 200, 300 may include a stack of multiple narrow brush rings.

Figure 4:
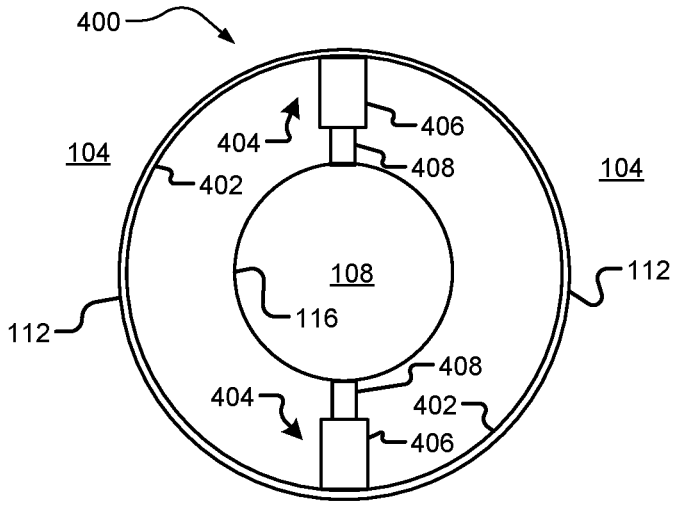
FIGS. 4-5 are diagrams of example spring-loaded connectors employable in the current discharge assembly of FIG. 1, according to the present disclosure.
Figure 5:
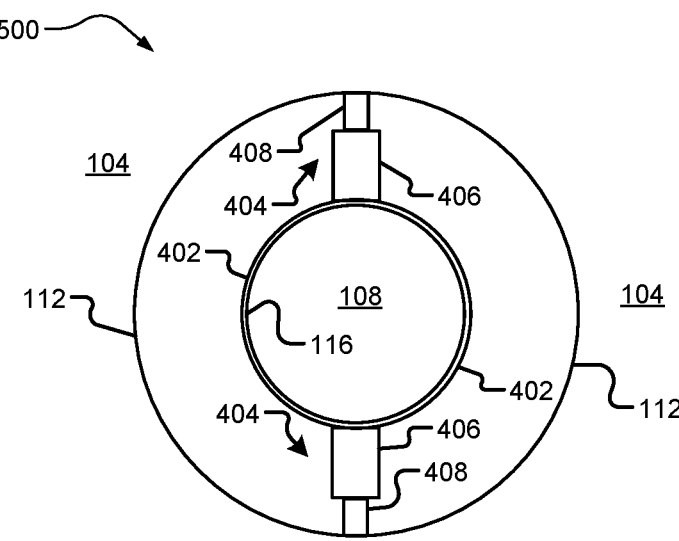

FIGS. 4-5 depict examples of different configurations of spring-loaded connectors 400, 500 that may be employed as the connector 110 of FIG. 1. For example, and as shown in FIGS. 4-5, each connector 400, 500 is positioned between the inner surface 112 of the rotor shaft 104 and the outer surface 116 of the ground element 108 of FIG. 1.

Specifically, FIG. 4 depicts the connector 400 as including a body 402 and two spring-loaded sticks 404 extending from the body 402. In such examples, the body 402 is a circular structure that may contact the inner surface 112 of the rotor shaft 104. In the example of FIG. 4, each spring-loaded stick 404 includes a housing 406 attached to the body 402 and an elongated member 408 protruding from the housing 406.

In the example of FIG. 4, the spring-loaded sticks 404 bias against the outer surface 116 of the ground element 108. For example, although not shown, each spring-loaded stick 404 includes a biasing member (e.g., a spring, etc.) to force the elongated member 408 inward towards and against the ground element 108.

In FIG. 5, the connector 500 is similar to the connector 400 of FIG. 4 but where the connector 500 is in a different configuration. Specifically, the connector 500 includes the body 402 and two spring-loaded sticks 404 of FIG. 4. However, in FIG. 5, the body 402 contacts the outer surface 116 of the ground element 108. Additionally, the spring-loaded sticks 404 of FIG. 5 bias against the inner surface 112 of the rotor shaft 104. For example, the biasing member (not shown in FIG. 5) of each spring-loaded stick 404 forces the elongated member 408 outward towards and against the rotor shaft 104.

The spring-loaded sticks 404 of FIGS. 4-5 may have any suitable electrically conductive material. For example, the spring-loaded stick 404 may include a carbon stick (e.g., carbon graphite) as the elongated member 408. Additionally, while the connectors 400, 500 of FIGS. 4-5 are shown as including two spring-loaded sticks 404, it should be appreciated that in other embodiments more or less spring-loaded sticks may be employed if desired.

Figure 6:
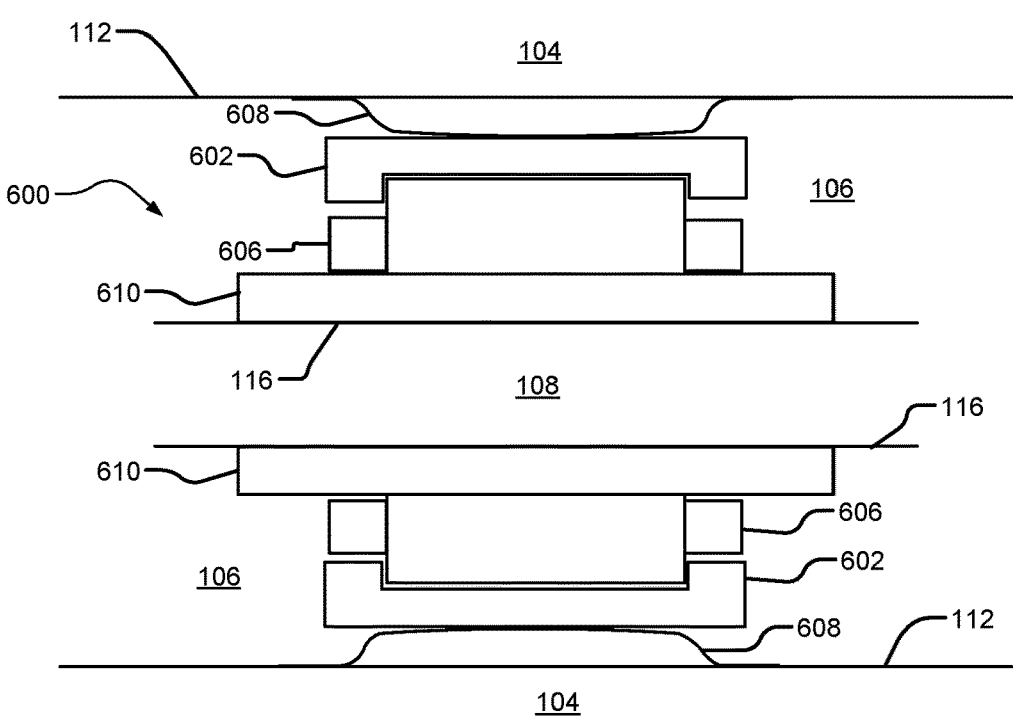
FIG. 6 is a diagram of an example bearing employable in the current discharge assembly of FIG. 1, according to the present disclosure.

FIG. 6 depicts an example of a bearing 600 that may be employed as the connector 110 of FIG. 1. For example, and as shown in FIG. 6, the bearing 600 is positioned in the channel 106 of the rotor shaft 104 of FIG. 1, and between the inner surface 112 of the rotor shaft 104 and the outer surface 116 of the ground element 108 of FIG. 1. In such examples, the bearing 600 may be a sacrificial bearing.

Specifically, in FIG. 6, the bearing 600 is an example of a roller bearing. In such examples, the bearing 600 may include conventional components, such as an outer race 602 rotating with the rotor shaft 104, a cage 606 for holding rollers, and an inner race 610. Additionally, in some examples, the bearing 600 may include a seal (e.g., a solid lube) between the outer race 602 and the inner race 610.

As shown in FIG. 6, an optional mounting bracket 608 may be positioned between the bearing 600 and the inner surface 112 of the rotor shaft 104. Additionally, an optional sleeve may be positioned about and in contact with the outer surface 116 of the ground element 108. The mounting bracket 608 is formed or includes electrically conductive material. In such examples, the mounting bracket 608 may be a ring-shaped device having an inner compressible portion that presses against the bearing 600 to hold the bearing 600 in position and keep the outer race 602 electrically coupled to the rotor shaft 104. Additionally, the sleeve may be pressed onto the ground element 108 for assisting with assembling the bearing 600 about the ground element 108.

Figure 7:
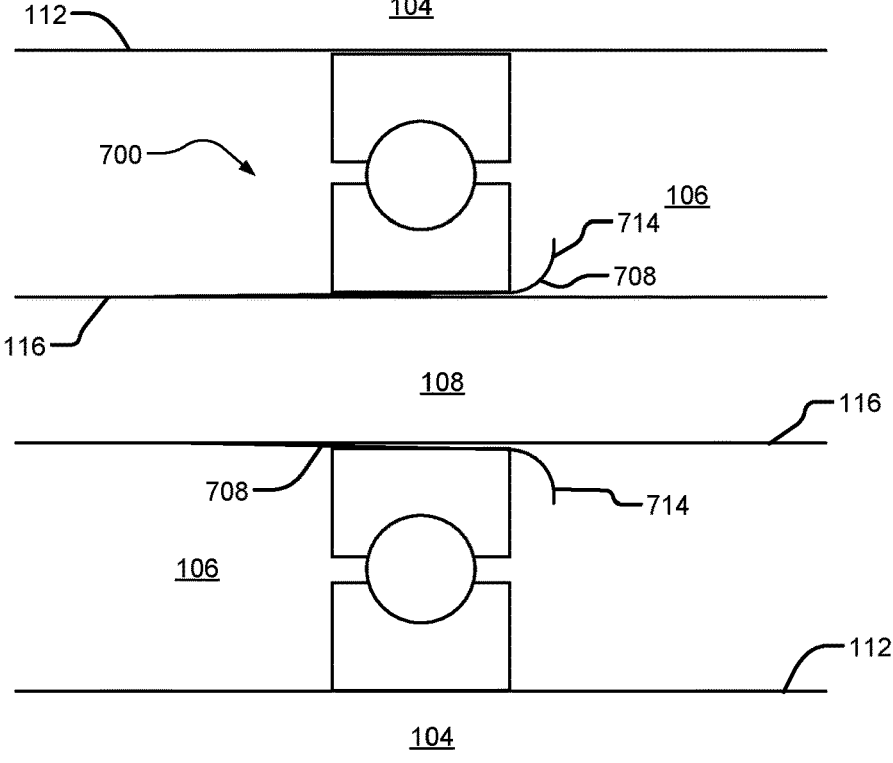
FIG. 7 is a diagram of an example connector and an inner mounting bracket employable in the current discharge assembly of FIG. 1, according to the present disclosure.

In other examples, an optional electrically conductive mounting bracket may be positioned between one of the connectors herein and the ground element 108. For example, FIG. 7 depicts a connector 700 and a mounting bracket 708. In the example of FIG. 7, the connector 700 may be similar to any one of the other connectors herein, such as a bearing having an inner race and an outer race. As shown, the connector 700 is positioned in the channel 106 of the rotor shaft 104 of FIG. 1. More specifically, the connector 700 is positioned between the inner surface 112 of the rotor shaft 104 and the outer surface 116 of the ground element 108 of FIG. 1.

The mounting bracket 708 of FIG. 7 is positioned between the connector 700 and the outer surface 116 of the ground element 108. For example, in the example of FIG. 7, the mounting bracket 708 extends circumferentially along an outer diameter of the ground element 108 (e.g., a pipe). In such examples, the mounting bracket 708 presses against an inner side of the connector 700 and the outer surface 116 of the ground element 108 to hold the connector 700 (e.g., an inner race of a bearing) in position.

Figure 8:
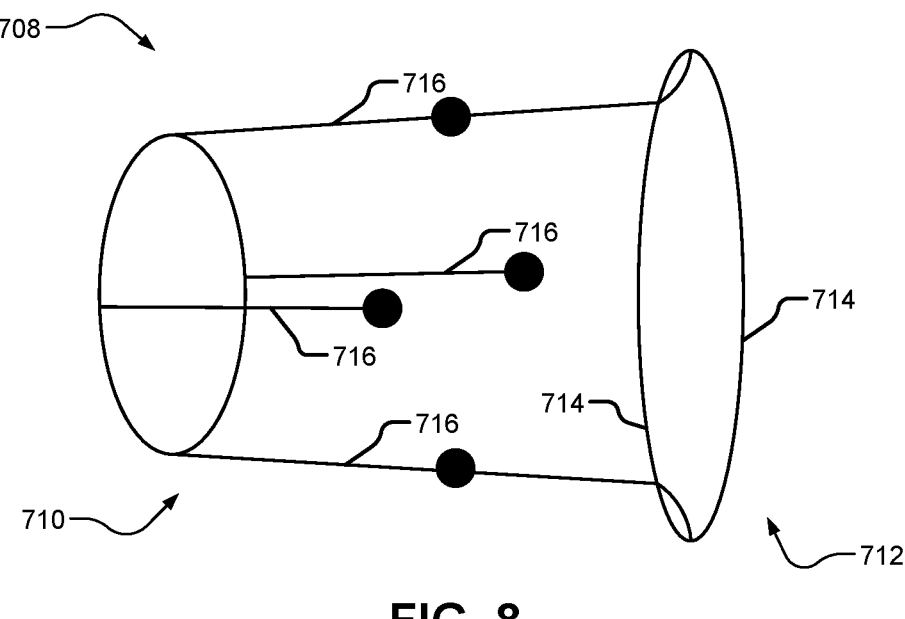
FIG. 8 is a diagram of the inner mounting bracket of FIG. 7.

As shown in FIGS. 7-8, the mounting bracket 708 may be a ring-shaped device having a tapering configuration. In such examples, the mounting bracket 708 has a diameter that increases from one end 710 of the mounting bracket 708 to the other opposing end 712 of the mounting bracket 708. In various embodiments, the mounting bracket 708 may have a lip portion 714 at the end 712 for securing the connector 700 and split fingers 716 for contacting and pressing against the ground element 108 (e.g., a pipe) to maintain an electrically coupling between the mounting bracket 708 and the ground element 108.

Figure 9:
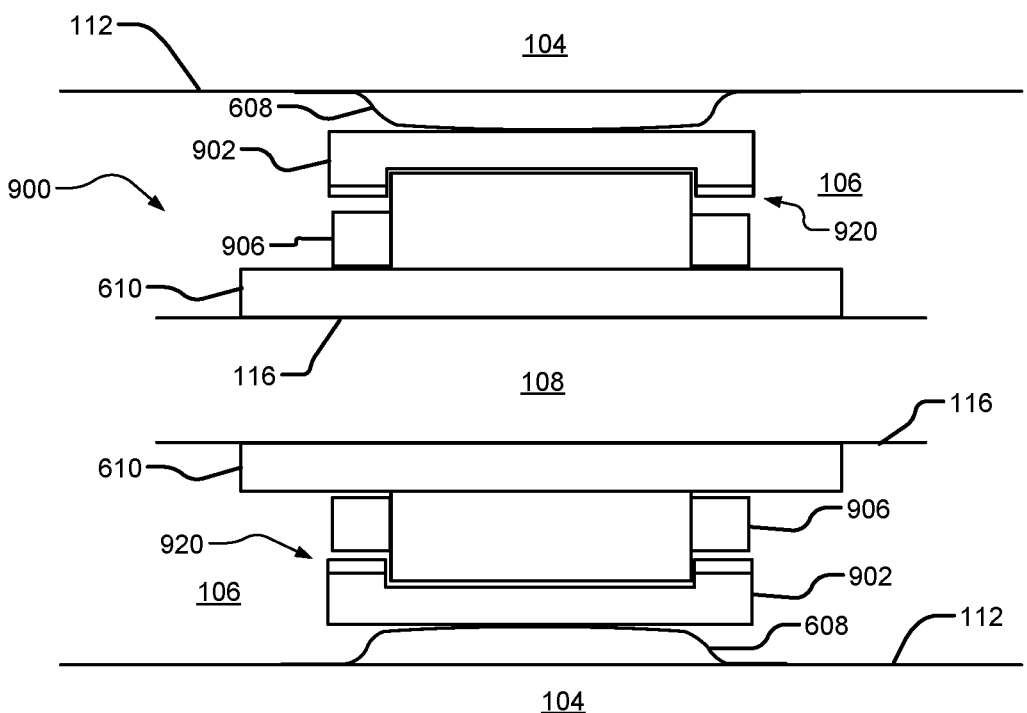
FIG. 9 is a diagram of another example bearing employable in the current discharge assembly of FIG. 1, according to the present disclosure.

FIG. 9 depicts another example of bearing 900 that may be employed as the connector 110 of FIG. 1. For example, in FIG. 9, the bearing 900 (e.g., a sacrificial bearing) is an example of a roller bearing positionable in the channel 106 of the rotor shaft 104 of FIG. 1, and between the inner surface 112 of the rotor shaft 104 and the outer surface 116 of the ground element 108 of FIG. 1. In the example of FIG. 9, the mounting bracket 608 of FIG. 6 is positioned between the bearing 900 and the inner surface 112 of the rotor shaft 104. Similar to the bearing 600 of FIG. 6, the bearing 900 of FIG. 9 may include conventional components, such as an outer race 902 rotating with the rotor shaft 104, an inner race 906 for holding rollers, and a seal 920 between the outer race 902 and the inner race 906 to hold a conductive grease therein.

Figure 10:
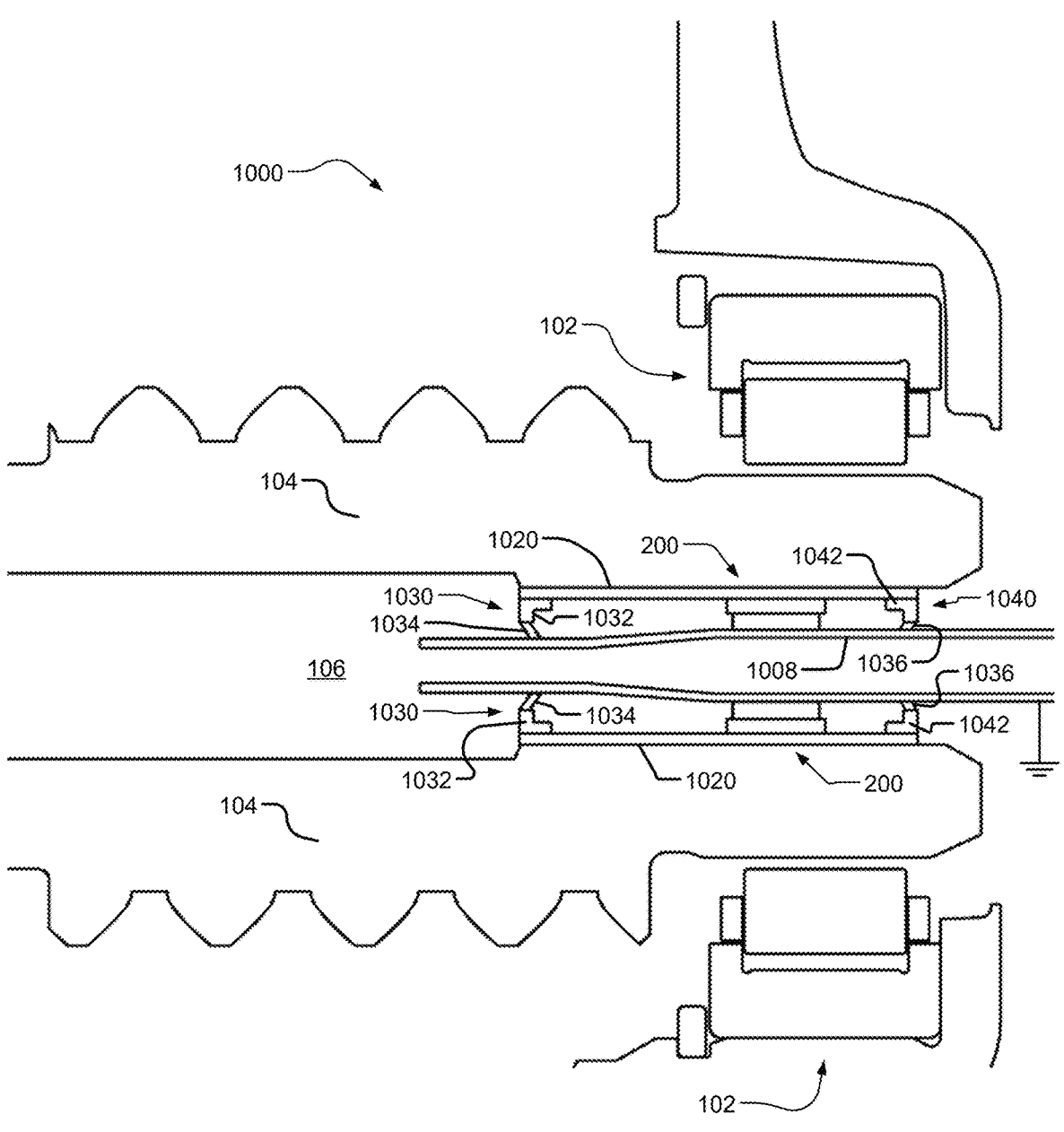
FIG. 10 is a diagram of another example current discharge assembly including the brush of FIG. 2, according to the present disclosure.

FIG. 10 depicts another example current discharge assembly 1000 that is similar to the current discharge assembly 100 of FIG. 1 but with an electrically conductive mounting bracket 1020 and plugs 1030, 1040. For example, and as shown in FIG. 10, the current discharge assembly 1000 generally includes the bearing 102 and the rotor shaft 104 of FIG. 1, the brush 200 of FIG. 2, and a lube pipe 1008 extending into the channel 106 of the rotor shaft 104. In such examples, the lube pipe 1008 is electrically conductive and grounded, as explained above relative to the ground element 108 of FIG. 1. While the current discharge assembly 1000 of FIG. 10 is shown as including the brush 200, it should be appreciated that in other embodiments another suitable connector (e.g., any one of the other connectors disclosed herein, etc.) may be employed if desired.

In the example of FIG. 10, the brush 200 electrically couples the rotor shaft 104 to the lube pipe 1008. With this configuration, EDM current generated in the rotor shaft 104 due to accumulated voltage on the rotor shaft 104 and/or other circulating current in the rotor shaft 104 is allowed to flow from the rotor shaft 104 to the lube pipe 1008 via the brush 200. As such, current is directed away from the bearing 102, thereby preventing damage to the bearing 102.

As shown in FIG. 10, the mounting bracket 1020 is positioned between the body of the brush 200 and the inner surface of the rotor shaft 104. In such examples, the mounting bracket 1020 extends circumferentially along an outer diameter of the channel 106 and against the inner surface of the rotor shaft 104. In such examples, the brush 200 (e.g., the body of the brush 200) and the plugs 1030, 1040 are attached to the mounting bracket 1020. More specifically, the body of the brush 200 and a cup shaped body 1032, 1042 of each plug 1030, 1040 are attached to the mounting bracket 1020.

In the example of FIG. 10, the plugs 1030, 1040 are positioned on opposing sides of the brush 200. Specifically, the plug 1030 is positioned adjacent to a side of the brush 200 near an outlet of the lube pipe 1008 and the plug 1040 is positioned adjacent to the opposing side of the brush 200 near an end of the rotor shaft 104. While the current discharge assembly 1000 of FIG. 10 is shown as including two plugs 1030, 1040, it should be appreciated that in other embodiments more or less plugs and/or other suitable sealing mechanisms may be employed if desired.

In some examples, one or both plugs 1030, 1040 may prevent lubricant provided by the lube pipe 1008 from contacting the brush 200. For example, in the example of FIG. 10, the plug 1030 is positioned in the channel 106 between the lube pipe 1008 and the rotor shaft 104. In such examples, each plug 1030, 1040 include a flexible lip seal 1034, 1036 extending from the body 1032, 1042 and contacting the lube pipe 1008. With this configuration, the plug 1030 prevents lubricant flowing out of the pipe 1008 from contacting the brush 200, thereby providing a lube free, substantially dry environment (e.g., cavity) for the brush 200. In various embodiments, the plug 1040 may include a similar flexible lip seal is desired.

Figure 11:
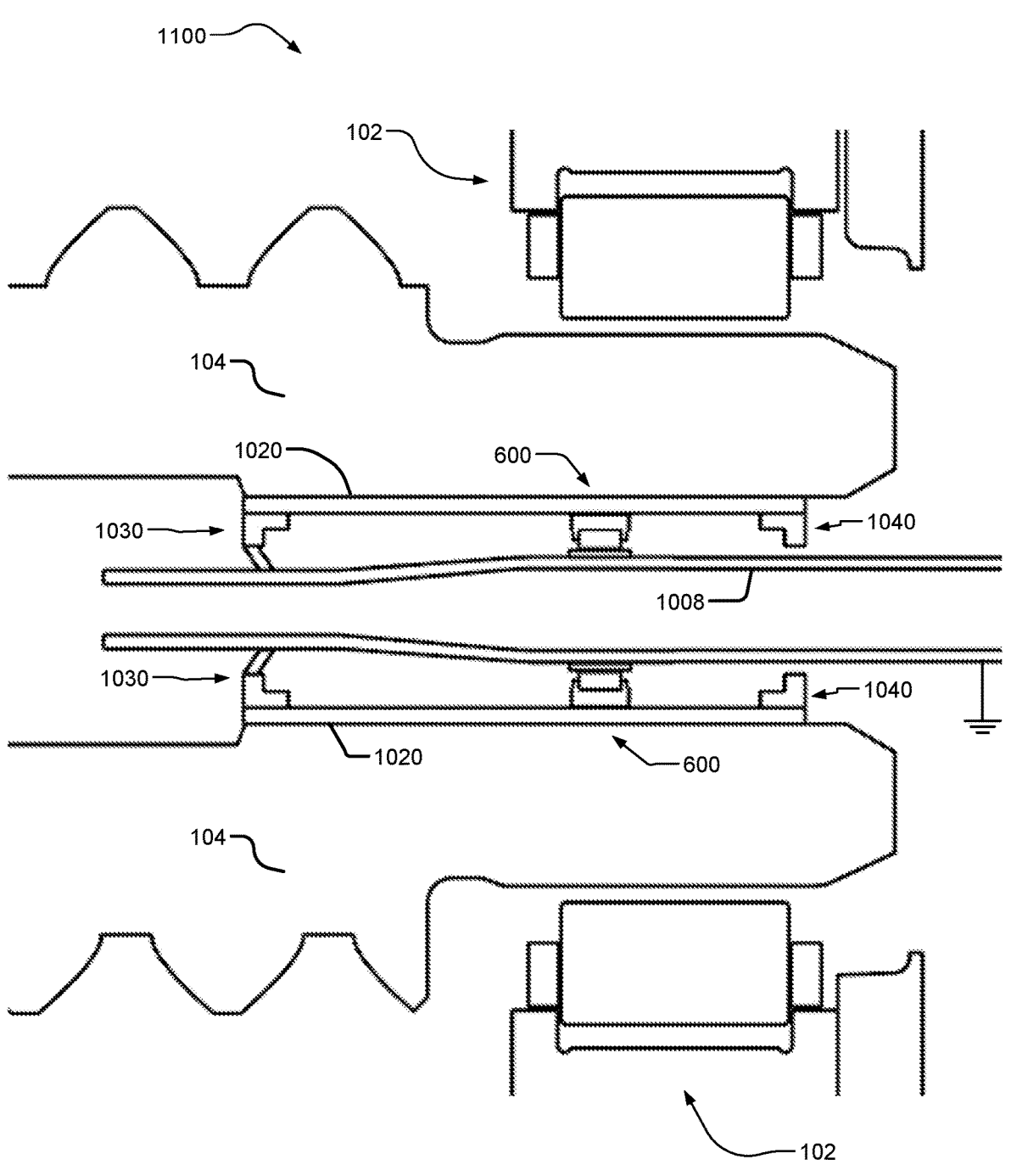
FIG. 11 is a diagram of another example current discharge assembly including the bearing of FIG. 6, according to the present disclosure.

FIG. 11 depicts another example current discharge assembly 1100 that is similar to the current discharge assembly 1000 of FIG. 10 but includes a different connector between the rotor shaft 104 and the lube pipe 1008. For example, the current discharge assembly 1100 of FIG. 11 generally includes the bearing 102 and the rotor shaft 104 of FIG. 1, the bearing 600 of FIG. 6, and the lube pipe 1008, the mounting bracket 1020 and the plugs 1030, 1040 of FIG. 10. In this example, the bearing 600 electrically couples the rotor shaft 104 to the lube pipe 1008. As such, EDM current generated in the rotor shaft 104 due to accumulated voltage on the rotor shaft 104 and/or other circulating current in the rotor shaft 104 is allowed to flow from the rotor shaft 104 to the lube pipe 1008 via the bearing 600. As such, current is directed away from the bearing 102, thereby preventing damage to the bearing 102.

Figure 12:
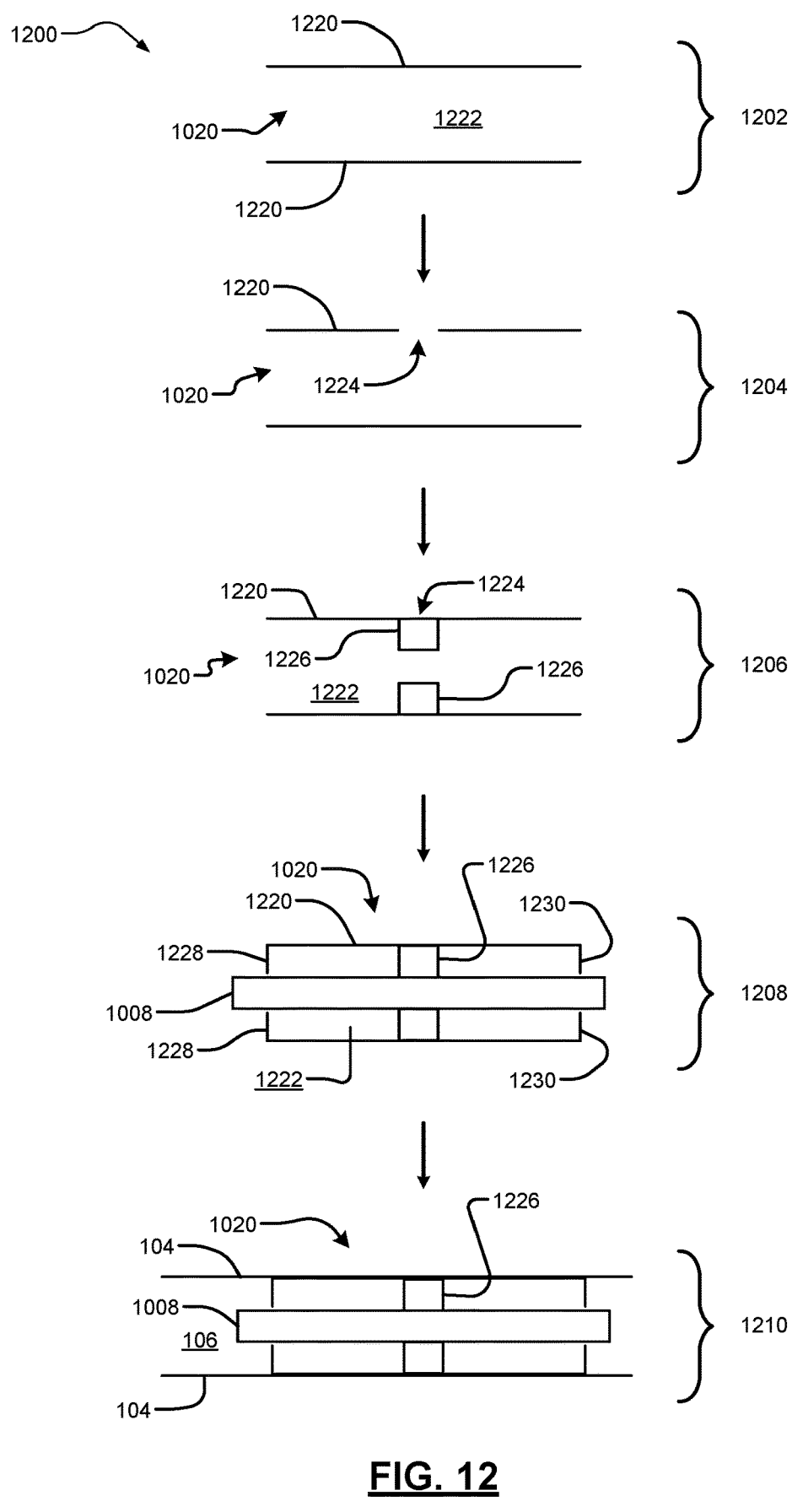

FIG. 12 depicts an example method 1200 for manufacturing a current discharge assembly for an electric machine in an electric vehicle. While FIG. 12 is shown and described as including specific steps, it should be appreciated that the method 1200 of FIG. 12 is one example variation that may be implemented and in other embodiments the method 1200 and/or other example methods may include different steps, more or less steps, etc. Additionally, although the method 1200 is described in relation to specific components herein (e.g., the mounting bracket 1020, the lube pipe 1008, etc.), it should be appreciated that the method 1200 may be employable with other suitable components.

As shown in FIG. 12, the method 1200 begins at step 1202 where the mounting bracket 1020 is provided. In this example, the mounting bracket 1020 is a ring-shaped device having a body 1220 defining a bracket channel 1222 extending therethrough. Next, at step 1204, the mounting bracket 1020 is cut. For example, and as shown in step 1204, at least one slot 1224 is cut into the body 1220 of the mounting bracket 1020.

Then, at step 1206, a connector 1226 is attached to the mounting bracket 1020 via the slot 1224. For example, in FIG. 12, the connector 1226 may be pressed into and at least partially through the slot 1224 and snapped into position. As such, the connector 1226 extends into the bracket channel 1222, as shown in FIG. 12. In various embodiments, the connector 1226 may be a C-shaped brush and have a bristle configuration similar to the brush 200 of FIG. 2 or the brush 300 of FIG. 3. In other embodiments, the connector 1226 may be another suitable device, such as a bearing, a spring-loaded connector, etc. as explained herein.

At step 1208 of the method 1200, a ground element is inserted into the bracket channel 1222 of the mounting bracket 1020 to contact the connector 1226. In the example of FIG. 12, the ground element is the lube pipe 1008 that provides lubricant into the channel 106 of the rotor shaft 104, as further referenced below.

In various embodiments, one or more dams may be formed, as shown at step 1208 of FIG. 12. For example, end portions of the body 1220 of the mounting bracket 1020 may be bent, pressed, etc. inward to form dams 1228, 1230, as shown in FIG. 12. In other examples, the dams 1228, 1230 may be welded or attached to the body 1220 of the mounting bracket 1020 in another suitable manner. In still other examples, the dams 1228, 1230 may be plugs (e.g., the plugs 1030, 1040) that are attached or otherwise formed on the mounting bracket 1020, as explained herein. Regardless of the configuration, the dams 1228, 1230 (or the plugs) prevent lubricant provided by the pipe 1008 from contacting the connector 1226.

Then, at step 1210, the lube pipe 1008 and the assembled mounting bracket 1020 with the connector 1226 and the dams 1228, 1230 are inserted into the channel 106 of the rotor shaft 104. After this step, the connector 1226 electrically couples the rotor shaft 104 to the lube pipe 1008 to allow current to flow from the rotor shaft 104 to the lube pipe 1008 via the connector 1226.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A current discharge assembly for an electric machine in an electric vehicle, the current discharge assembly comprising:

a rotor shaft defining a channel;

a ground pipe extending into the channel and configured to provide a lubricant into the channel of the rotor shaft;

a connector positioned within the channel of the rotor shaft and extending circumferentially between the rotor shaft and the ground pipe, the connector configured to electrically couple the rotor shaft to the ground pipe when the rotor shaft is rotating to allow current to flow from the rotor shaft to the ground pipe via the connector;

a first plug and a second plug positioned in the channel between the ground pipe and the rotor shaft, the first plug positioned adjacent to a first side of the connector, the second plug positioned adjacent to a second side of the connector opposing the first side, and the first plug and the second plug configured to prevent the lubricant provided by the ground pipe from contacting the connector; and a mounting bracket extending circumferentially along an outer diameter of the channel and positioned between the connector and the rotor shaft, wherein the connector, the first plug and the second plug are attached to the mounting bracket.

2. The current discharge assembly of claim 1, wherein the connector is a brush including a body and a plurality of bristles extending from the body.

3. The current discharge assembly of claim 2, wherein the plurality of bristles include carbon fiber.

4. The current discharge assembly of claim 2, wherein the plurality of bristles extend from the body towards the ground pipe and are configured to contact the ground pipe.

5. The current discharge assembly of claim 2, wherein the plurality of bristles extend from the body towards the rotor shaft and are configured to contact the rotor shaft.

6. The current discharge assembly of claim 1, wherein the connector is a bearing positioned between the rotor shaft and the ground pipe.

7. The current discharge assembly of claim 6, wherein the bearing is a roller bearing or a ball bearing.

8. The current discharge assembly of claim 1, wherein the connector includes a body and one or more spring loaded sticks configured to bias against one of the rotor shaft and the ground pipe.

9. The current discharge assembly of claim 8, wherein the one or more spring loaded sticks are configured to bias against the rotor shaft.

10. The current discharge assembly of claim 8, wherein the one or more spring loaded sticks are configured to bias against the ground pipe.

11. A method for manufacturing a current discharge assembly for an electric machine in an electric vehicle, the electric machine including a rotor shaft defining a shaft channel, the method comprising:

providing a mounting bracket having a body defining a bracket channel extending therethrough;

cutting at least one slot into the body of the mounting bracket;

attaching a connector to the mounting bracket via the slot, the connector extending into the bracket channel;

inserting a ground pipe into the bracket channel of the mounting bracket to contact the connector extending into the bracket channel, the ground pipe providing a lubricant into the shaft channel of the rotor shaft;

inserting the ground pipe and the mounting bracket with the attached connector into the shaft channel of the rotor shaft so that the mounting bracket extends circumferentially along an outer diameter of the shaft channel, the mounting bracket is positioned between the connector and the rotor shaft, and the connector electrically couples the rotor shaft to the ground pipe when the rotor shaft is rotating to allow current to flow from the rotor shaft to the ground pipe via the connector; and forming a first plug and a second plug between the ground pipe and the rotor shaft to prevent the lubricant provided by the ground pipe from contacting the connector, the first plug positioned adjacent to a first side of the connector, and the second plug positioned adjacent to a second side of the connector opposing the first side, wherein the first plug and the second plug are attached to the mounting bracket.

12. The method of claim 11, wherein attaching the connector to the mounting bracket via the slot includes pressing the connector into the slot.

13. The method of claim 11, wherein the connector is a brush having a plurality of bristles.

14. A current discharge assembly for an electric machine in an electric vehicle, the current discharge assembly comprising:

a rotor shaft defining a channel;

a ground pipe extending into the channel and configured to provide a lubricant into the channel of the rotor shaft;

a connector positioned within the channel of the rotor shaft and extending circumferentially between the rotor shaft and the ground pipe, the connector configured to electrically couple the rotor shaft to the ground pipe when the rotor shaft is rotating to allow current to flow from the rotor shaft to the ground pipe via the connector;

a first plug and a second plug positioned in the channel between the ground pipe and the rotor shaft, the first plug positioned adjacent to a first side of the connector, the second plug positioned adjacent to a second side of the connector opposing the first side, and the first plug and the second plug configured to prevent the lubricant provided by the ground pipe from contacting the connector; and a mounting bracket extending circumferentially along an outer diameter of the ground pipe and positioned between the connector and the ground pipe, wherein the connector is attached to the mounting bracket, the mounting bracket having a tapering ring-shape with a diameter that increases from a first end of the mounting bracket to a second, opposing end of the mounting bracket.

15. The current discharge assembly of claim 14, wherein the mounting bracket includes a lip at the second end of the mounting bracket and one or more fingers extending from the first end of the mounting bracket.

16. The current discharge assembly of claim 15, wherein the one or more fingers are configured to contact and press against the ground pipe.

17. The current discharge assembly of claim 16, wherein the connector is a bearing positioned between the rotor shaft and the ground pipe.

18. The current discharge assembly of claim 17, wherein the bearing is a roller bearing or a ball bearing.

19. The current discharge assembly of claim 14, wherein the connector is a brush including a body and a plurality of carbon fiber bristles extending from the body.

20. The current discharge assembly of claim 14, wherein the connector includes a body and one or more spring loaded sticks configured to bias against one of the rotor shaft and the ground pipe.

* * * * *